United States Patent Office 2,759,889
Patented Aug. 21, 1956

2,759,889

METHOD OF RECOVERING GLYCERINE FROM FERMENTATION PRODUCTS

Justin Zender, Ardsley, N. Y., assignor to Glycerine Corporation of America, Inc., New York, N. Y., a corporation of Delaware No Drawing. Continuation of application Serial No. 204,494, January 4, 1951. This application March 30, 1954, Serial No. 419,933

9 Claims. (Cl. 210—8.5)

This application is a continuation of my copending application Serial No. 204,494 filed January 4, 1951.

This invention relates to recovery of glycerine from fermentation slops and is directed particularly to methods wherein the glycerine is extracted by dialysis through a semi-permeable membrane.

It has been suggested heretofore that glycerine might be recovered from fermentation slops by dialysis in a process wherein the slops and water are circulated on opposite sides of a semi-permeable membrane. In order to render such a process effective, the slops generally have to be concentrated to such an extent that they contain from about 20 to 25% of glycerine. Even then, the aqueous dialysate generally contains only about 1 to 2% of glycerine and only about 40 to 70% of the glycerine can be extracted economically from fermentation slops by such a process, even when using a continuous counter-current process. Furthermore, the slops contain large amounts of inorganic salts which pass through the semi-permeable membrane and are contained in the resulting dialysate. It is therefore necessary to carry out further purification steps in order to eliminate the inorganic salts from the glycerine so as to obtain a product capable of commercial use.

In accordance with the present invention, these objections to methods of the prior art are overcome and a process is provided wherein the glycerine content of the slops may be substantially less than heretofore necessary. Furthermore, the concentration of the glycerine in the dialysate is materially increased and the amount of glycerine extracted may be substantially quantitative. Of even greater importance is the fact that but very little of the inorganic salts are contained in the dialysate with the result that the glycerine obtained can be used directly in many commercial operations as, for example, as a plasticizing agent, or for use in the production of dynamite.

These advantages of the present invention are obtained by employing alcohols as the dialyzing liquid. While various alcohols and mixtures of alcohols may be used it is preferable to employ those which are miscible or soluble in water to some extent.

One of the objects of the present invention is to provide an economical method for the recovery of glycerine from fermentation slop.

Another object of the invention is to provide a method wherein glycerine is extracted from fermentation slops by dialysis using alcohols as the dialyzing liquid.

A further object of the invention is to provide methods whereby the glycerine extracted from fermentation slops by dialysis will be relatively free of inorganic salts and other impurities.

These and other objects and features of the present invention will appear from the following description thereof in which reference is made to typical procedures and examples for the purpose of indicating the nature of the present invention but without intending to limit the scope of the invention thereby.

In carrying out the present invention, the fermentation slops employed may be obtained from any suitable source. Thus, for example, the slops remaining after the distillation of alcohol from the products of fermentation of molasses with yeast, may be used. In the alternative, the products of fermentation of other sugar or starch containing products may be employed if desired. The method of fermentation may be varied and in a typical case is carried out by the fermentation of molasses under alkaline conditions, or in the presence of sodium sulfite and/or sodium bisulfite. The slops obtained by fermentation of molasses when using sodium bicarbonate or ammonia generally contain in the neighborhood at 2% of glycerine, whereas the concentration of the glycerine in slops obtained when sodium sulfite and bisulfite are used may be as much as 6 or 8% or higher. In any event, it is preferable to concentrate the slops to some extent so as to increase the glycerine content before dialysis. The concentration may be carried out until the slops contain as much as 20 or 25%, as has been usual in conducting aqueous dialysis but, in accordance with the present invention, such concentration is not necessary and need not be more than 8 or 10%. In fact, the process is operable even when the slops are not concentrated at all and contain only 2 to 8% of glycerine although for economical and faster operation concentration of the slops is desired.

The fermentation slops resulting from the fermentation of molasses contain inorganic salts which generally include large amounts of calcium salts formed during the process of manufacturing the sugar and molasses. Additional salts are frequently introduced in adjusting the pH value of the fermentation mixture or as nutrient material for the yeasts employed. Such salts generally include calcium sulfate, calcium phosphate and various carbonates, sulfites and bi-sulfites. Sugar cane also is known to contain relatively large amounts of silicates, and therefore, various silicate salts may be present in the fermentation slops.

The dialyzing liquid employed in accordance with the present invention is preferably an alcohol or a mixture of alcohols. Normal and isopropyl alcohol and normal, secondary or tertiary butyl alcohol are preferred. Methyl and ethyl alcohol when used by themselves or in combination are found to cause diffusion of large amounts of inorganic salts and dark colored material or caramelized sugars to take place in dialyzing fermentation slops. Normal butyl alcohol can be used by itself and the dialysate obtained is bright and clear and contains substantially no inorganic salts. However, the diffusion of glycerine through the semi-permeable membrane when using normel butyl alcohol takes place relatively slowly. It thus appears that the rate of diffusion of both the glycerine and the inorganic salts through semi-permeable membranes is related in some way to the degree of solubility of the alcohol in water. It may, therefore, be said in general, that any alcohol which is soluble in water to the extent of 5% or more may be used in the practice of the present invention. Further, it has been found that excellent results are obtained when ethyl alcohol is mixed with the less soluble normal and secondary butyl alcohols. Mixtures containing equal parts of ethyl alcohol and normal butyl alcohol have been found to be very effective in carrying out the present invention. The alcohols which may be used in carrying out the present invention may further be defined as those which contain from 1 to 4 carbon atoms and preferably the alcohols containing 3 or 4 carbon atoms.

It is further desirable to maintain the alchol relatively concentrated and, in general, the dialysate should contain at least 50% and preferably 75% or more of alcohol.

The semi-permeable membrane employed may be composed of any conventional hydrophilic material which is not dissolved or adversely effected by the alcohol. Typical of such membranes are regenerated cellulose, parchment paper, formalized gelatin, alkali soluble-water insoluble ethers, hydroxy cellulose and the like. However, cellophane and particularly cellophane #300 has been found most useful in the dialyzing of fermentation slops using isopropyl alcohol or mixtures of ethanol and butanol as the dialyzing liquid.

The process can be carried out at room temperature but is preferably conducted at somewhat elevated temperatures, say around 28 to 32° C. Continuous counter-current flow of the fermentation slops and alcohol are desirable in order that the highest yield can be obtained in the minimum length of time.

A characteristic feature of the present invention which distinguishes it materially from aqueous methods of dialysis resides in the fact that water passes from the slops to the dialysate during the course of the present process and as a result, the slops tend to become further concentrated and it is frequently necessary to add water or otherwise dilute the slops so as to keep them sufficiently fluid for effective circulation through the dialyzing apparatus. This is in contrast with methods of aqueous dialysis wherein the aqueous dialyzing medium penetrates the membrane and continuously dilutes the slops making it necessary to reconcentrate them from time to time. In accordance with the present invention it is the dialysate which is diluted by the water passing through the semi-permeable membrane from the slops. Thus, if static dialysis is continued for long periods of time the dialysate needs to be concentrated.

In order to illustrate typical practice in accordance with the present invention, the following examples are cited.

Example I

A fermentation liquor obtained after distillation of alcohol therefrom contained 10.05 grams per 100 cc. of "solids" consisting of substances which remained after heating to 110° C. and including glycerine, salts, proteins, gums and other impurities. This liquor was concentrated and 100 ccs. of the concentrate placed in a container formed of regenerated cellulose and surrounded by anhydrous normal butyl alcohol (which if soluble in water only to the extent of about 8%).

After 24 hours of static dialysis the normal butyl alcohol solvent was found to contain 2.11 grams of glycerine, .066 gram of salts and about 5 grams of water which had diffused through the membrane. This represented nearly 25% of the glycerine contained in the concentrate whereas less than 1% of the salts were extracted. The diffusate was light amber in color and relatively clear as compared with that obtained by dialysis using water as the solvent, indicating much less diffusion of the caramelized sugars and dark coloring agents of the slops.

By repeating the static diffusion with fresh solvent or by using continuous counter-current flow of the solvent and fermentation liquor more than 90% of the glycerine in the concentrate can be recovered and it is found to contain only about 3% of salts as impurities. Therefore further treatment to obtain pure glycerine is simple and inexpensive.

Example II

The process of Example I was repeated using a concentrated fermentation slop containing 12.5 grams of glycerine and 56 grams of salts and other impurities per 100 ccs. The solvent used was 91% isopropyl alcohol. By using two successive static dialysis treatments 3.73 grams of glycerine and 1.99 grams of salts were recovered while 14 ccs. of water diffused through the membrane and served to dilute the isopropyl alcohol solvent. The color of the diffusate was a light amber. The amount of glycerine recovered thus amounted to about 30% of that contained in the concentrate, whereas only about 3½% of the salts diffused through the membrane.

Example III

When 95% ethyl alcohol was used as the solvent with the concentrate of Example II the recovery of glycerine on two static treatments was 43%, but 18 ccs. of water diffused through the membrane and the amount of salts recovered was substantially higher than in the preceding examples. Moreover, the diffusion of caramelized sugars and other dark colored substances was substantial as indicated by the very dark color of the diffusate. The glycerine thus obtained was not satisfactory for most practical purposes and would require substantial further purification before it could be used in general commercial trade.

Example IV

Slops obtained after the distillation of alcohol from the products of fermentation of diluted molasses with dry yeast under alkaline conditions, and initially containing about 2% of glycerine were concentrated until the glycerine content was 8.26%. The slops were continually passed on one side of a form of cellophane #300 while 91% isopropyl alcohol was continuously passed in contact with the opposite side of the membrane. Dialyzing was continued for a period of 4¾ hours whereupon it was found that the dialysate contained 4.52% of glycerine and had extracted 85% of the glycerine from the fermentation slops. The dialysate obtained contained only 0.34% of salts. The volume of alcohol employed was 1.31 times the volume of the slops. The dialysate was distilled to remove the water and the resulting glycerine was of sufficient purity for use directly in the manufacture of dynamite.

Example V

Fermentation slops concentrated to contain 7.6% of glycerine were dialyzed in a continuous counter-current operation using 91% isopropyl alcohol in the same manner as described in Example I. The operation was continued for a period of 3¼ hours whereupon it was found that the dialysate contained 3.32% of glycerine and represented a recovery of 99.2% of the glycerine contained in the slops. The amount of isopropyl alcohol employed was 1:6 times the amount of slops used in this experiment. Only traces of inorganic salts were found in the dialysate.

Example VI

Fermentation slops and isopropyl alcohol were passed in continuous counter-current relation with respect to a semi-permeable membrane formed of cellophane #300. 250 parts of isopropyl alcohol were circulated per hour while 160 parts of the slops were circulated each hour. The process was continued for a period of 20 hours. The slops contained 7.6% of glycerine and 7.06% of salts. The dialysate contained 3.13% of glycerine and 0.20% of salts. The total amount of glycerine recovered was 72% of that contained in the fermentation slops.

Each of the foregoing examples was repeated using a mixture of 50 parts ethanol and 50 parts normal butyl alcohol which was found to offer the advantages of each type of alcohol without their individual disadvantage. The amount of glycerine recovered was substantially the same in each case but the inorganic salts were still limited to mere traces in each instance so that the resulting glycerine was substantially pure.

In general, in carrying out the process of the present invention, the concentration of the glycerine in the dialysate runs from 3 to 6% and in excess of 70% of the glycerine can be extracted from the fermentation slops. In fact, substantially quantitative extraction can be effected by prolonged dialysis although the slops tend to become so concentrated or dehydrated that water generally has to be added to maintain a fluid condition.

While typical examples of procedure in accordance with the present invention have been cited above, it will be evident that the source of the fermentation material used as slops, the type of alcohol and the conditions of operation may be modified considerably without departing from the spirit and principle of the invention. In view thereof, it should be understood that the particular compositions, proportions and methods of procedure described above are intended to be illustrative only and are not intended to limit the scope of the invention.

What I claim is:

1. The method of recovering glycerine from fermentation slops which comprises the steps of placing the slops in contact with one side of a semi-permeable membrane and an alcohol which is soluble in water to the extent of at least 5%, on the opposite side of said semi-permeable membrane, and separating glycerine from the resulting alcoholic dialysate.

2. The method of recovering glycerine from fermentation slops which comprises the steps of passing the slops into contact with one side of a semi-permeable membrane and passing an alcohol which is soluble in water to the extent of at least 5%, in counter-current relation into contact with the opposite side of said semi-permeable membrane, and separating glycerine from the resulting alcoholic dialysate.

3. The method of recovering glycerine from fermentation slops which comprises the steps of concentrating the slops until the glycerine content thereof is about 8% or more, thereafter passing the slops into contact with one side of a semi-permeable membrane and passing an alcohol containing from 1 to 4 carbon atoms in counter-current relation into contact with the opposite side of said semi-permeable membrane, and separating glycerine from the resulting alcoholic dialysate.

4. The method of recovering glycerine from fermentation slops which comprises the steps of passing the slops into contact with one side of a semi-permeable membrane and passing isopropyl alcohol in counter-current relation into contact with the opposite side of said semi-permeable membrane, and separating glycerine from the resulting alcoholic dialysate.

5. The method of recovering glycerine from fermentation slops which comprises the steps of passing the slops into contact with a mixture containing equal parts of ethyl alcohol and secondary butyl alcohol in counter-current relation into contact with the opposite side of said semi-permeable membrane, and separating glycerine from the resulting alcoholic dialysate.

6. The method of recovering glycerine from fermentation slops which comprises the steps of placing the slops in contact with one side of a semi-permeable membrane and placing a mixture of alcohols containing from 1 to 4 carbon atoms, at least half of which alcohols contain at least 3 carbon atoms, on the opposite side of said semi-permeable membrane while maintaining the temperature of the slops and dialysate at about 28 to 32° C.

7. The method of recovering glycerine from fermentation liquids which comprises the steps of passing said liquid in contact with one face of a hydrophilic semi-permeable membrane, passing a liquid containing at least 50% of a mixture of alcohols which contains from 1 to 4 carbon atoms, at least half of which alcohols contain at least 3 carbon atoms, in contact with the opposite face of the membrane, and separating glycerine from the resulting alcoholic dialysate.

8. The method of recovering relatively salt-free glycerine from fermentation slops containing a high percentage of inorganic salts which comprises the step of passing said slops into contact with one face of a hydrophilic semi-permeable membrane while passing a mixture of alcohols containing from 1 to 4 carbon atoms, at least half of which alcohols contain at least 3 carbon atoms, in contact with the opposite face of the membrane, and separating the alcohol from the relatively salt-free glycerine containing diffusate thereby obtained.

9. A process for recovering relatively salt-free glycerine from fermentation slops containing large amounts of inorganic salts which comprises the steps of passing the fermentation slops across one face of a hydrophilic semi-permeable membrane, passing across the other face of said membrane an aqueous liquid containing at least 50% of a mixture of alcohols each of which contains from 1 to 4 carbon atoms, and at least half of which contain at least 3 carbon atoms, directing the flow of the slops and alcohol counter-current to each other, evaporating off the alcohol from the resulting alcohol-glycerine solution, and recirculating the alcohol across said membrane.

References Cited in the file of this patent

UNITED STATES PATENTS

| | | |
|---|---|---|
| 1,885,393 | Van Schaack | Nov. 1, 1932 |
| 2,408,625 | Graham et al. | Oct. 1, 1946 |
| 2,571,210 | Craver | Oct. 16, 1951 |

FOREIGN PATENTS

| | | |
|---|---|---|
| 355,294 | Great Britain | Aug. 21, 1931 |